United States Patent [19]

Clot et al.

[11] Patent Number: 5,174,030
[45] Date of Patent: Dec. 29, 1992

[54] APPARATUS FOR MEASURING LENGTH AND PERIMETER

[75] Inventors: Robert Clot, Lyons; Jerome Darragon, Les Abrets; Bernard Buffevant, Vernaison, all of France

[73] Assignee: Centre Technique Cuir Chaussure Maroquinerie, Lyons, France

[21] Appl. No.: 753,900

[22] Filed: Sep. 3, 1991

[30] Foreign Application Priority Data

Sep. 11, 1990 [FR] France ................. 90 11636

[51] Int. Cl.⁵ .................. A43D 1/02; G01B 5/00
[52] U.S. Cl. ........................ 33/3 C; 33/709; 33/783; 33/793; 33/555.4; 33/761
[58] Field of Search ............... 33/3 R, 3 B, 3 C, 3 A, 33/704, 755, 759, 764, 762, 765, 769, 783, 784, 792, 793, 795, 794, 809, 555.1, 555.4

[56] References Cited

U.S. PATENT DOCUMENTS

| 857,542 | 6/1907 | Twain ................ 33/3 A |
| 1,448,222 | 3/1923 | Johnston et al. . |
| 1,936,998 | 11/1933 | Summers ................ 33/755 |
| 2,129,582 | 9/1938 | Johansson ................ 33/761 |
| 2,223,000 | 11/1940 | Daley, Jr. ................ 33/555.4 |
| 3,032,880 | 5/1962 | Shaw . |
| 3,648,377 | 3/1972 | Witzke ................ 33/555.1 |
| 3,967,383 | 7/1976 | Collins ................ 33/555.4 |
| 4,164,815 | 8/1979 | Salomon ................ 33/36 |
| 4,574,486 | 3/1986 | Drescher ................ 33/765 |
| 4,779,212 | 10/1988 | Levy ................ 33/755 |

FOREIGN PATENT DOCUMENTS

| 810081 | 5/1974 | Belgium . |
| 221901 | 5/1910 | Fed. Rep. of Germany . |
| 458882 | 4/1928 | Fed. Rep. of Germany . |
| 486402 | 11/1929 | Fed. Rep. of Germany . |
| 601271 | 2/1926 | France . |
| 1551242 | 11/1968 | France ................ 33/761 |
| 2350086 | 12/1977 | France . |
| 1188510 | 10/1985 | U.S.S.R. ................ 33/555.1 |
| 1245141 | 9/1971 | United Kingdom ................ 33/784 |

Primary Examiner—Thomas B. Will
Attorney, Agent, or Firm—Herbert Dubno; Andrew Wilford

[57] ABSTRACT

An apparatus for measuring the length or perimeter of an object has a main housing part provided with a main abutment and forming a main attachment location and a movable housing part provided with a movable abutment normally spaced longitudinally from the main abutment and with a movable location forming a guide. The movable part is longitudinally displaceable on the main housing part so as to displace the abutments longitudinally relative to each other and also to displace the locations longitudinally relative to each other. A flexible but substantially inextensible element has an outer end fixed to the main attachment location and an outer portion extending between the locations, passes through the guide at the movable location, has an intermediate portion guided in the movable part, and has an inner portion extending in the main portion and an inner end. One of the housing parts is provided at the inner end with a system for maintaining the element under tension and normally extending longitudinally straight between the locations. In addition one of the housing parts can display the measured length or perimeter of the object.

11 Claims, 1 Drawing Sheet

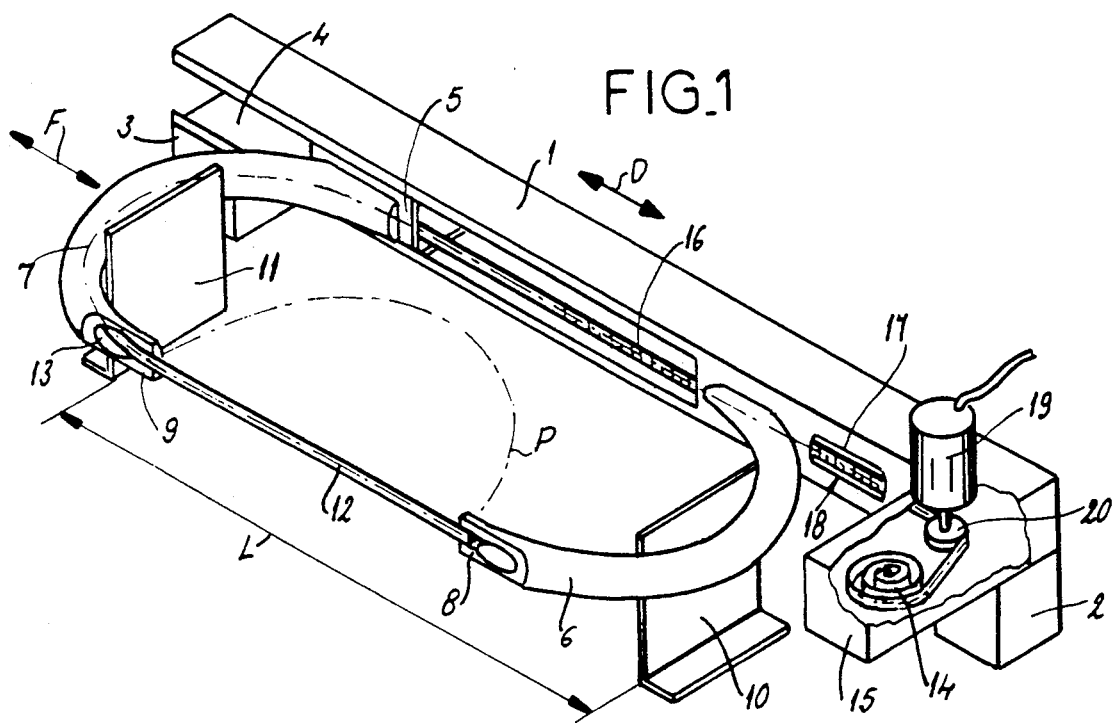
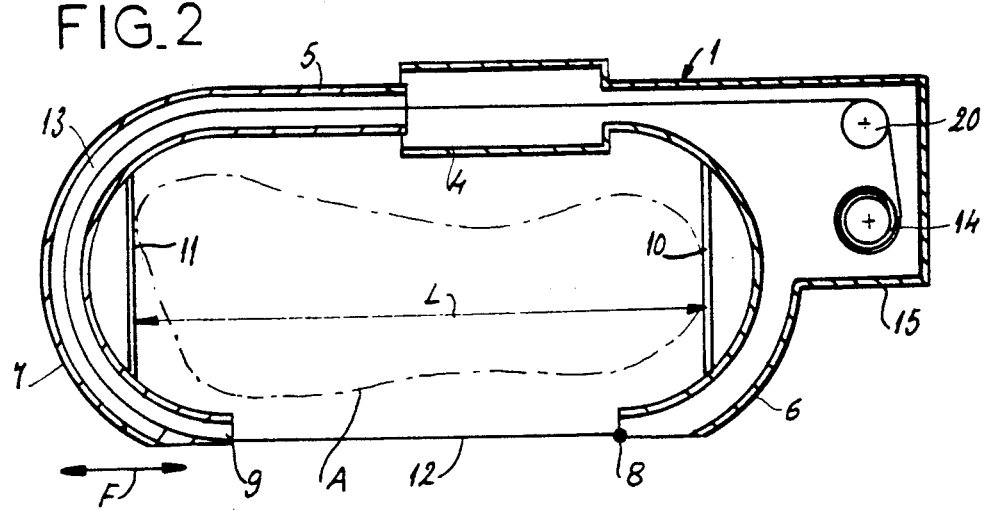
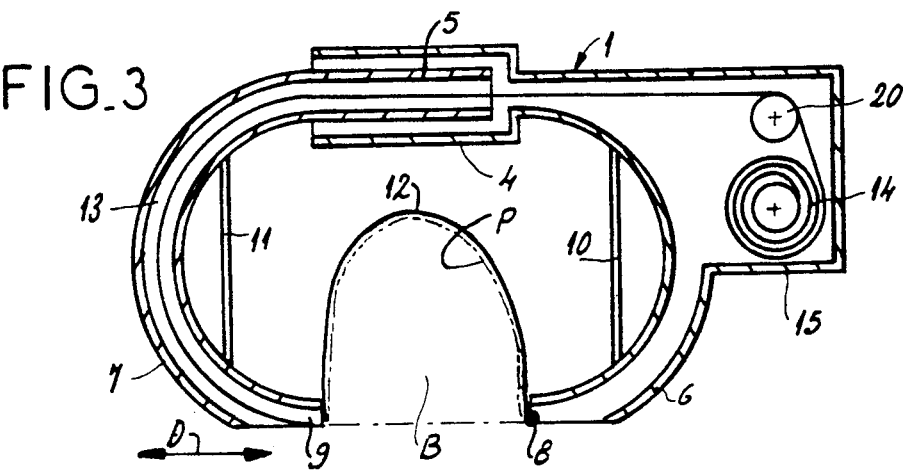

APPARATUS FOR MEASURING LENGTH AND PERIMETER

FIELD OF THE INVENTION

The present invention relates to an apparatus for measuring the length and the perimeter of an object. More particularly this invention concerns a device usable for measuring human body parts to fit shoes, hats, or other accessories to them.

BACKGROUND OF THE INVENTION

Various devices are known that serve to measure the length of an object and that can also be adapted to measure the perimeter of all or part of the object, whether the object be of polygonal or smoothly curved shape. In order, for instance, to fit a shoe, hat, or glove, it is often necessary not only to take one or more length measurements of the body part to which the item will fit, but also to measure the perimeter of at least a portion of the body part. For a shoe the length of the foot plus the perimeter of the heel is important, while for a hat the perimeter of the head is critical and for a glove both the hand length and the fist perimeter are needed. When only the foot length measurement is used to fit a shoe, for instance, the result is often a relatively bad fit unless the perimeter of the metatarsophalangian joint is taken into account.

To date any device that is used in taking such measurements is fairly crude, typically being a simple flexible tape measure. In most cases it can normally only be used to take one single measurement, normally length, and any other measurements must be done with different equipment. Templates might be used to judge perimeter while a standard gauge is used for length, with the person making the measurements having to switch from one device to the other when doing the measure up.

OBJECTS OF THE INVENTION

It is therefore an object of the present invention to provide an improved apparatus that can measure both length and perimeter of an object.

Another object is the provision of such an improved apparatus that can measure both length and perimeter of an object which overcomes the above-given disadvantages, that is which is easy to use and that produces accurate easy-to-interpret readings.

SUMMARY OF THE INVENTION

An apparatus according to the invention for measuring the length or perimeter of an object has a main housing part provided with a main abutment and forming a main attachment location and a movable housing part provided with a movable abutment normally spaced longitudinally from the main abutment and with a movable location forming a guide. The movable part is longitudinally displaceable on the main housing part so as to displace the abutments longitudinally relative to each other and also to displace the locations longitudinally relative to each other. A flexible but substantially inextensible element has an outer end fixed to the main attachment location and an outer portion extending between the locations, passes through the guide at the movable location, has an intermediate portion guided in the movable part, and has an inner portion extending in the main portion and an inner end. One of the housing parts is provided at the inner end with a system for maintaining the element under tension and normally extending longitudinally straight between the locations. In addition one of the housing parts can display the measured length or perimeter of the object.

Thus it is possible with this apparatus to measure the length of an object by pushing one of the abutments against one end of the object and the other abutment against its opposite end and then reading the length. To measure the perimeter the object is pushed transversely between the two locations to loop the element around the object and a reading is again made. The device can measure the entire perimeter of something when the two locations start out abutting, are pushed apart as the element is looped around the object, and end up abutting.

According to the invention the element is maintained under tension by means of a roller on which the inner end is wound. The element is a tape and the means for displaying includes indicia on the tape and on the main housing part. This indicia in turn includes a location mark on the housing and two different scales on the tape, one of the scales being half as large as the other and serving to indicate perimeter. The display can also include an electronic displacement detector in the main housing part associated with the element therein. Such an electronic displacement detector includes a wheel over which the element passes and means for detecting the rotation of the wheel.

In accordance with this invention the main housing part includes an arcuate arm having an outer end forming the main location and the secondary housing part slides longitudinally in the main housing part and includes a hollow arcuate arm forming the guide and having an outer end confronting the outer end of the main-part arm and forming the movable location. Each of the parts is provided with a foot for supporting the housing horizontally on the ground. The housing parts are generally C-shaped and concavely longitudinally confront each other and the main housing part is movable between a position with the two locations substantially touching each other and a position with the two locations spaced longitudinally apart.

BRIEF DESCRIPTION OF THE DRAWING

The above and other objects, features, and advantages will become more readily apparent from the following, reference is made to the accompanying drawing in which:

FIG. 1 is a perspective view of the apparatus according to the invention;

FIG. 2 is a horizontal section in top view of the apparatus as it is used to measure length; and FIG. 3 is a view like FIG. 2 but showing the apparatus as it is used to measure perimeter.

SPECIFIC DESCRIPTION

As seen in the drawing the apparatus according to the invention has a main housing part 1 extending in a longitudinal direction D and having at its ends feet 2 and 3 that support it horizontally on the ground or floor. Longitudinally slidable in a guide 4 of the part 1 is a movable housing part 5. The parts 1 and 5 have similar C-shaped arms 6 and 7 that longitudinally concavely confront each other. The arm 6 has an outer end forming a fixed attachment location 8 and the arm 7 has an outer end 9 that forms a location 9 that can move longitudinally relative to the location 8. The arms 6 and 7 also support respective flat abutment plates 10 and 11 that confront each other longitudinally and that extend parallel to each other and perpendicular to the direction D.

A flexible tape 12 has an outer end fixed at the location 8 and extends through an arcuate guide 13 formed in the hollow arm 7, then back through the main housing 1 parallel to the direction D, and is wound up at its inner end on a roller 14 in an extension 15 of the housing 1. This roller 14 is spring loaded to maintain the tape 12 under tension. The tape 12 carries a pair of scales 16 that can be seen through a window 17 in the housing 1 adjacent a mark 18 to show how much of the tape is payed out, one of the scales being twice the size of the other. In addition the tape 12 passes over a wheel 20 of a rotation detector 19 that can be connected to an external or internal display to show how much of the tape 12 is payed out.

The apparatus can be used to measure length or perimeter:

To measure the length L of an object A, here a foot, the object A is placed between the abutments 10 and 11 and the tension of the tape 12 pulls these abutments toward each other and into contact with the ends of the object A. The larger scale 16 on the tape 12 is read, as the amount of tape 12 that is payed out is the twice the length L, starting of course from an easily established zero point.

To measure the perimeter P of an object B, here a heel of a foot, the two locations 8 and 9 are separated and are moved forward from the back of the object to points at predetermined distances from the starting location and are allowed to touch these points. The smaller scale 16 is then read since the amount of tape 12 payed out is the same as the measured perimeter. If the entire perimeter of an object is to be measured, the two locations 8 and 9 start together and the tape 12 is stretched completely around the object, which must of course have no outward concavities, until these locations 8 and 9 come together again.

This device can therefore be used relatively easily to measure the length of a foot and the heel perimeter, both measurements being essential to a good fit for a shoe. Similarly it can be used to measure sizes for headware, in particular protective gear, for gloves, or for virtually any other body part where more than one simple measurement is needed. If pressure sensors are provided in the arms 6 and 7, change in size can be monitored.

The invention is not limited to the illustrated embodiment but on the contrary its scope is that of the following claims. For instance any change in the shape or orientation of the arms 6 and 7 would lie within this invention. The tape 12 could be replaced by a succession of rigid links or other element, so long as it was flexible but relatively inextensible. Furthermore the length or perimeter is measured could be oriented vertically rather than horizontally.

We claim:

1. An apparatus for measuring the length and the perimeter of an object, the apparatus comprising:
    a main housing part provided with a main abutment and forming a main attachment location;
    a movable housing part provided with a movable abutment normally spaced longitudinally from the main abutment and with a movable location forming a guide, the movable part being longitudinally displaceable on the main housing part so as to displace the abutments longitudinally relative to each other and also to displace the locations longitudinally relative to each other;
    a flexible but substantially inextensible element passing through the guide at the movable location and having
        an outer end fixed to the main attachment location,
        an outer portion defined by and extending between the locations,
        an intermediate portion guided in the movable part,
        an inner portion extending in the main part, and
        an inner end;
    means in the main housing part at the inner end for maintaining the element under tension and normally extending longitudinally straight between the locations; and
    means in the main housing part for displaying the measured length of perimeter of the object, whereby when the outer portion extends straight between the locations the means for displaying shows the length of an object engaged between the abutments and when the outer portion lies on the surface of an object engaged between the locations means for displaying shows the perimeter of the object between the locations.

2. The measuring apparatus defined in claim 1 wherein the means for maintaining the element under tension includes a roller on which the inner end is wound.

3. The measuring apparatus defined in claim 1 wherein the element is a tape and the means for displaying includes indicia on the tape and indicia on the main housing part.

4. The measuring apparatus defined in claim 3 wherein the indicia includes a location mark on the housing and two different scales on the tape, one of the scales being half as large as the other and serving to indicate perimeter.

5. The measuring apparatus defined in claim 1 wherein the means for displaying includes an electronic displacement detector in the main housing for part associated with the element therein and operable to display the measured length or perimeter of the object.

6. The measuring apparatus defined in claim 5 wherein the electronic displacement detector includes a wheel over which the element passes and means for detecting the rotation of the wheel.

7. The measuring apparatus defined in claim 1 wherein the main housing part includes an arcuate arm having an outer end forming the main location and the movable housing part slides longitudinally in the main housing part and includes a hollow arcuate arm forming the guide and having an outer end confronting the outer end of the main-part arm and forming the movable location.

8. The measuring apparatus defined in claim 7 wherein each of the parts is provided with a foot for supporting the housing horizontally on the ground.

9. An apparatus for measuring the length and the perimeter of an object, the apparatus comprising:
    a main housing part provided with a main abutment and forming a main attachment location;
    a movable housing part provided with a movable abutment normally spaced longitudinally from the main abutment and with a movable location forming a guide, the movable part being longitudinally displaceable on the main housing part so as to displace the abutments longitudinally relative to each other and also to displace the locations longitudinally relative to each other;

a flexible but substantially inextensible element passing through the guide at the movable location and an inner end fixed to the main housing part, the element having an outer portion defined by and extending between the locations;

means in the main housing part for maintain the element under tension and normally extending longitudinally straight between the locations; and means in the main housing part for displaying measured length or perimeter of the object, whereby when the outer portion extends straight between the locations the means for displaying shows the length of an object engaged between the abutments and when the outer portion lies on the surface of an object engaged between the locations the means for displaying shows the perimeter of the object between the locations.

10. The apparatus defined in claim 9 wherein the housing parts are generally C-shaped and concavely longitudinally confront each other.

11. The apparatus defined in claim 9 wherein the main housing part is movable between a position with the two locations substantially touching each other and a position with the two locations spaced longitudinally apart.

* * * * *